(12) United States Patent
Hecht

(10) Patent No.: US 8,388,275 B2
(45) Date of Patent: Mar. 5, 2013

(54) CUTTING INSERT HAVING RECESSED PLANAR PORTION AND CUTTING TOOL THEREFOR

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 478 days.

(21) Appl. No.: 12/770,404

(22) Filed: Apr. 29, 2010

(65) Prior Publication Data

US 2010/0290846 A1  Nov. 18, 2010

(30) Foreign Application Priority Data

May 13, 2009  (IL) .......................................... 198726

(51) Int. Cl.
*B23B 27/16* (2006.01)
(52) U.S. Cl. ........................................ 407/113; 407/103
(58) Field of Classification Search .................. 407/113, 407/103
See application file for complete search history.

(56) References Cited

U.S. PATENT DOCUMENTS

| | | | |
|---|---|---|---|
| 5,368,418 A | 11/1994 | Bentjens et al. | |
| 6,238,146 B1 | 5/2001 | Satran et al. | |
| 2003/0113175 A1 | 6/2003 | Wermeister | |
| 2008/0025803 A1 | 1/2008 | Hecht | |

FOREIGN PATENT DOCUMENTS

WO  2008/093931  8/2008

OTHER PUBLICATIONS

Official Action dated Jan. 11, 2012 issued in counterpart Israeli Patent Application No. 198726.
International Search Report in PCT/IL2010/000331, dated Aug. 5, 2010.

*Primary Examiner* — Daniel Howell
*Assistant Examiner* — Ryan Rufo
(74) *Attorney, Agent, or Firm* — Womble Carlyle

(57) ABSTRACT

A cutting tool includes a cutting insert releasably retained therein. The cutting insert has at least a first non-planar side surface, which includes a planar portion that is recessed with respect to other portions of the side surface such as the cutting edges thereof. The planar portion may be spaced apart from the cutting edges associated with that side surface. The planar portion is the only portion of the side surface to engage an abutment region or regions of a supporting wall of the cutting tool. The cutting insert may be double-sided, and include a second, opposing side surface having a respective planar portion formed therein, wherein the two opposing side surfaces interchange positions upon indexing of the cutting insert. The planar portion of the second side surface, which does not engage the abutment region or regions of supporting wall, does not interfere with the functionality of the cutting insert.

15 Claims, 3 Drawing Sheets

CUTTING INSERT HAVING RECESSED PLANAR PORTION AND CUTTING TOOL THEREFOR

FIELD OF THE INVENTION

The present invention relates to a cutting insert and to a cutting tool therefor, the cutting insert having a recessed planar portion formed on a side surface thereof.

BACKGROUND OF THE INVENTION

Many indexable cutting inserts used for turning, milling or other metal cutting operations include one or more operative and/or non-operative surfaces having non-planar shapes, for example, having concave, convex, bent, sunken, undulating, or bowed shapes, or other different non-planar shapes. These surfaces assume their non-planar shapes, for example, in order to satisfy various constraints arising from functional and geometrical requirements involved in the design of the cutting insert.

Some indexable, double-sided cutting inserts, for example, have two opposing surfaces, for example, two opposing side surfaces that assume identical, non-planar shapes. When such a cutting insert is retained in an insert pocket of a cutting tool, a first of the two opposing side surfaces functions, for example, as a clearance surface, and the second, opposite side surface may function as an engagement surface of the cutting insert, e.g., by engaging a supporting wall of the insert pocket. When the insert is indexed, for example, the two opposing side surfaces interchange positions and thus assume one another's functionality.

However, e.g., referring to the above example, due to ordinary imperfections in the manufacture of the cutting insert, in some instances the clearance surface is provided with beneficial clearance properties, but at the same time the engagement surface provides only deteriorated engagement with the supporting wall of the insert pocket. In attempt to overcome this, individual and extensive grinding of a plurality of surfaces and edges of each cutting insert has to be performed. The extensive grinding may be expensive, and in addition, in some instances the extensive grinding in combination with the geometry of the cutting inserts may result in unnecessary and even undesired grinding of cutting edges of these cutting inserts, for example, during grinding of other portions thereof.

It is the object of the present invention to provide a cutting insert and a cutting tool therefor, which significantly reduce or overcome the aforementioned disadvantages.

SUMMARY OF THE INVENTION

Some embodiments of the invention include a cutting insert and a cutting tool therefor. A cutting portion is formed at an end of the cutting tool. The cutting portion includes an insert pocket having a cutting insert, e.g., a double-sided cutting insert, releasably retained therein. The cutting insert includes two opposing rake surfaces and a peripheral surface extending therebetween, the peripheral surface including, for example, two identical, opposing major side surfaces and two opposing minor side surfaces. The two major side surfaces interchange positions, and functionalities, when the cutting insert is indexed.

In some embodiments the cutting insert is tangential, i.e., the cutting insert is oriented in the cutting tool in such a manner that during a cutting operation on a work-piece the majority of the cutting forces are directed along a major (thicker) dimension of the cutting insert. In some of these embodiments the major side surfaces may be larger in area than the rake surfaces and the minor side surfaces.

In some embodiments, each major side surface includes a planar portion, e.g., a planarly ground planar portion, to provide for the respective major side surface, by turns, well defined engagement with one or more abutment regions of a supporting wall of the retaining insert pocket. The planar portion of each major side surface may include either a single planar surface or two coplanar surfaces. The two planar portions on the respective major side surfaces may be parallel to one another. Each planar portion may extend to at least one of the minor side surface, for example, to both the minor side surfaces.

In some embodiments, e.g., in which each planar portion includes a single planar surface, the planar surface assumes a generally rectangular shape. In some of these embodiments, the planar surface surrounds a respective opening of a through-bore that extends between the major side surfaces. In other embodiments, e.g., in which the planar portion includes two coplanar surfaces, the two coplanar surfaces are located on opposite sides of the opening of the through-bore, respectively, and on opposite sides of the major side surface with respect to a median plane of the cutting insert that passes through the major side surfaces and through the rake surfaces.

In some embodiments, each planar portion may be recessed relative to other portions of the respective major side surface, for example, relative to two relief surfaces formed on each respective major side surface and separated by the planar portion. Each of the relief surfaces may extend to an edge, e.g., to a cutting edge of the cutting insert, and assume a generally concave shape, for example, in order to comply with functional requirements of the cutting insert, e.g., clearance requirements or other cutting requirements.

In some embodiments, each planar portion may be at least partially confined by the respective relief surfaces, and therefore not extend, for example, all the way to any edge, e.g., to any cutting edge of the cutting insert. Accordingly, the free planar portion, that is, the planar portion that does not engage the one or more abutment regions of the supporting wall is relieved from the work-piece and therefore does not interfere with the cutting operation. Accordingly, an indexable, double-sided cutting insert according to embodiments of the invention is thus provided both with appropriate relief surfaces and with appropriate engagement means, provided by the planar portions in each major side surface, for well defined engagement with the insert pocket.

In addition, by virtue of the extension of each planar portion to both of the minor side surfaces, a plurality of planar portions of a respective plurality of cutting inserts according to the present invention may be planarly ground with considerable ease and efficiency. This is so, for example, since a plurality of cutting inserts according to the present invention can be arranged in a row on a single base plate, to have their respective planar portions ground collectively, for example, in a single, planar grinding operation. This overcomes, for example, the necessity for extensive, individual, and/or undesired grinding of a plurality of surfaces and edges of each separate cutting insert, which might additionally result in undesired grinding of cutting edges of the respective cutting inserts.

BRIEF DESCRIPTION OF THE DRAWINGS

For a better understanding of the present invention and to show how the same may be carried out in practice, reference will now be made to the accompanying drawings, in which.

Figure 1:
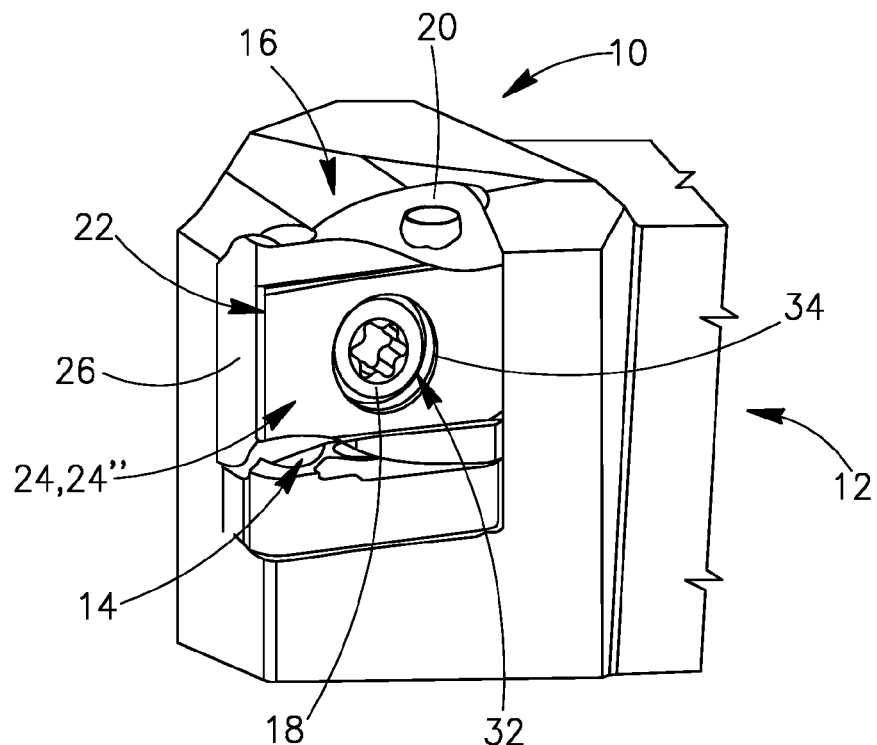
FIG. 1 is a perspective view of a cutting portion of a cutting tool, including an insert pocket having a cutting insert releasably retained therein, in accordance with some embodiments of the invention.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Although some drawings herein show a turning tool, the present invention is not limited in this respect. For example, embodiments of the invention may refer to other cutting tools, e.g., to milling tools, reaming tools, parting tools, or other metal cutting tools having one or more cutting inserts releasably retained therein.

Additionally, although some drawings herein show a cutting insert having a specific shape, e.g., having a specific contour shape, embodiments of the present invention are not limited in this respect. Embodiments of the invention may include, or may refer to cutting inserts having other shapes.

Reference is made to FIG. 1, showing a cutting portion 10 of a cutting tool 12, in accordance with some embodiments.

In some embodiments, the cutting portion 10 includes an insert pocket 14 formed at an end thereof, the insert pocket 14 having a cutting insert 16, e.g., an indexable, double-sided cutting insert releasably retained therein, secured in the insert pocket 14 by a securing component 18, for example, a screw. The cutting insert 16 may be a tangential cutting insert, including two opposing rake surfaces 20 and a peripheral surface 22 extending therebetween.

The peripheral surface 22 may include two opposing major side surfaces 24 and two opposing minor side surfaces 26, wherein each minor side surface extends between two major side surfaces 24. The peripheral surface 22 and the rake surfaces 20 meet at respective edges 28, at least a section of which form respective cutting edges 30.

The cutting insert 16 may include a through-bore 32 to receive the securing component 18 therein, wherein the through-bore 32 may extend between, and open out to, both the major side surfaces 24, forming respective openings 34 thereat. In some embodiments, the major side surfaces 24 may be larger in area than other surfaces of the cutting insert 16.

Figure 2:
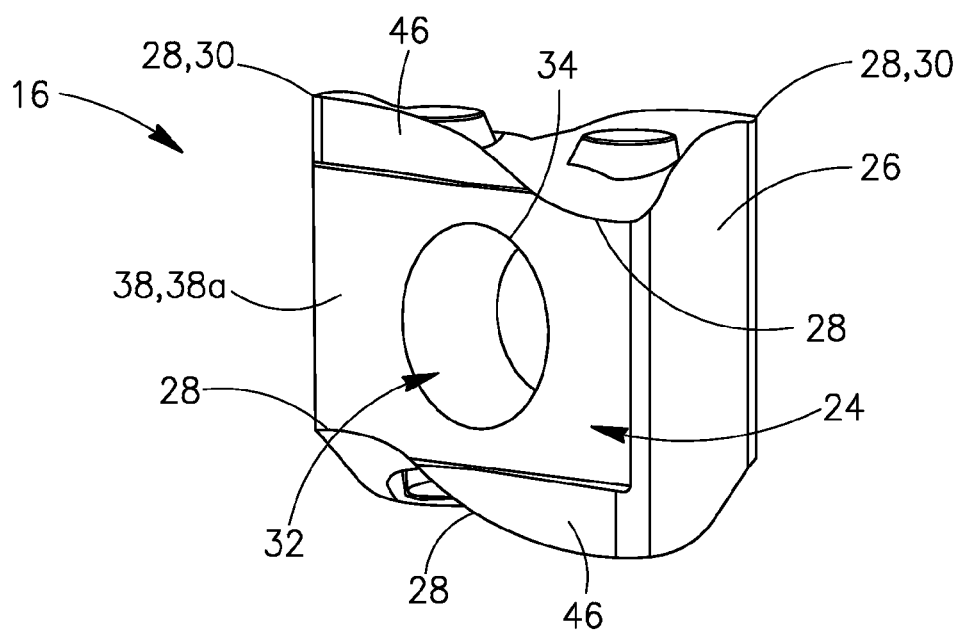
FIG. 2 is a perspective view of the cutting insert of FIG. 1, in accordance with some embodiments of the invention.
Figure 3:
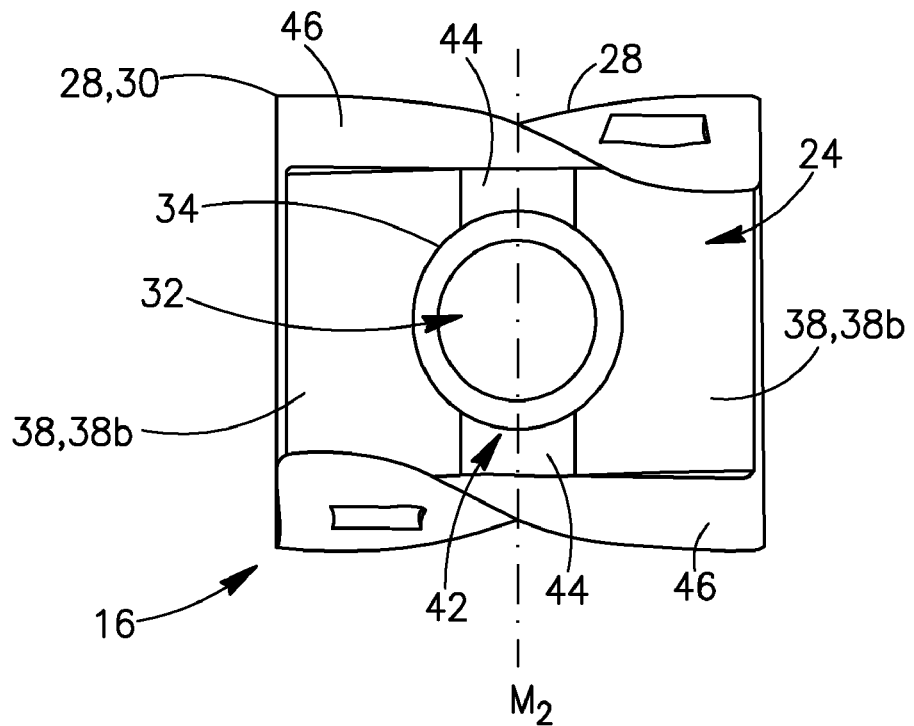
FIG. 3 is a major side view of the cutting insert, in accordance with other embodiments of the invention.
Figure 4:
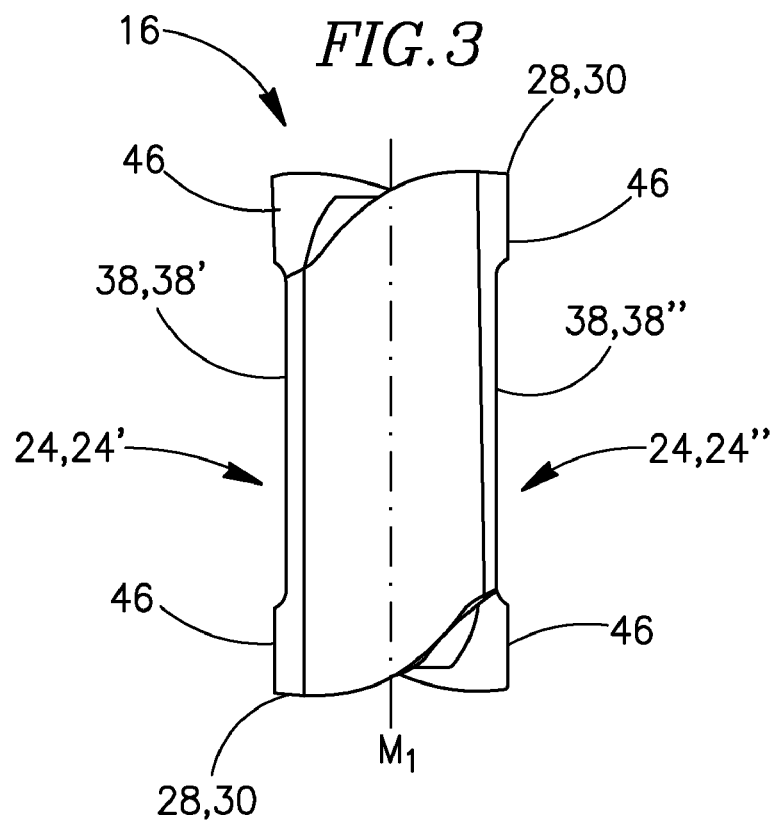
FIG. 4 is a minor side view of the cutting inserts of FIGS. 1 and 3, in accordance with embodiments of the invention.
Figure 5:
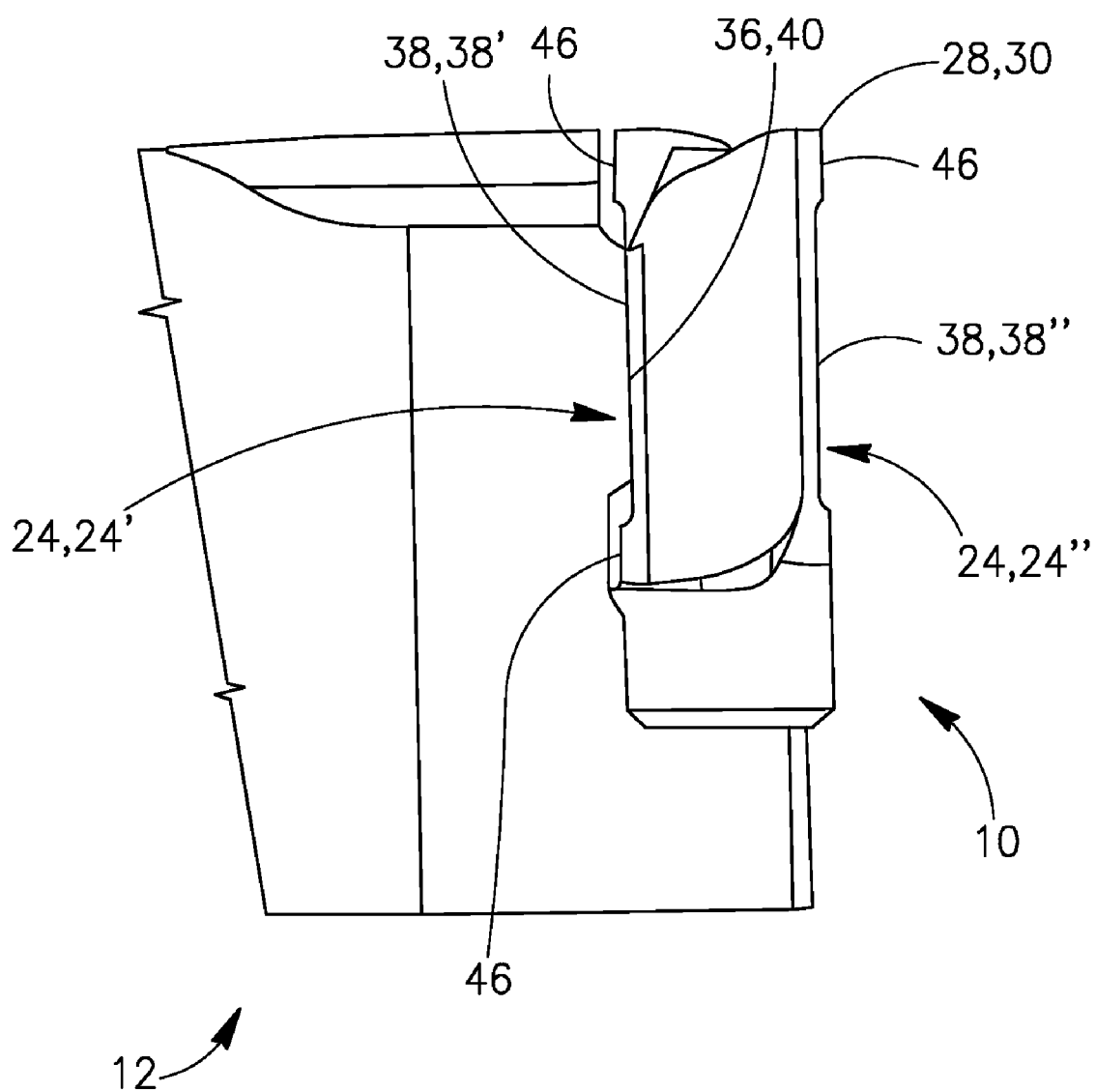
FIG. 5 is an end view of the cutting portion of FIG. 1, in accordance with some embodiments of the invention.

Reference is made to FIGS. 2-4, showing two different embodiments of the cutting insert 16, and to FIG. 5, showing an end view of the cutting portion 10, in accordance with some embodiments of the invention.

In some embodiments, the two opposing major side surfaces 24 may be identical, and include a first major side surface 24', which engages a supporting wall 36 of the insert pocket, and a second major side surface 24" that functions, for example, as a clearance surface, e.g., as shown in FIG. 5. The first and second major side surfaces 24 may interchange positions, and thus interchange functionality, when the cutting insert 16 is indexed, e.g., resulting in that the second major side surface 24" engages the supporting wall.

In some embodiments, each major side surface 24 includes a respective planar portion 38 for engagement with one or more abutment regions 40 of the supporting wall 36, which may also be generally planar in shape. The first major side 24' surface thus includes a first planar portion 38' and the second side surface 24" includes a second planar portion 38", e.g., as shown in FIGS. 4 and 5.

In some embodiments, a first median plane $M_1$ extends through the two rake surfaces 20 and through the two minor side surfaces 26. A second median plane $M_2$ extends through the major side surfaces 24 and through the rake surfaces 20, the second median plane $M_2$ extending, for example, substantially perpendicular to the first median plane $M_1$. In some embodiments, the planar portions 38 of the two major side surfaces 24 are parallel to one another, and parallel, for example, to the first median plane $M_1$.

In some embodiments, each of the planar portions 38 may extend to at least one minor surface 26, for example extend to both the minor surfaces 26. This allows, for example, each planar portion 38 to be planarly ground in a single grinding operation. In some embodiments, if, for example, a relatively large amount of material is removed in the grinding operation, the planar portion 38 may assume the shape of a single planar surface 38a, e.g., as shown in FIG. 2. In this case, the single planar surface 38a has a general rectangular shape, which is perforated by the opening 34 of the through-bore 32 into the respective major side surface 24.

In other embodiments, if, for example, a relatively small amount of material is removed in the grinding operation, each planar portion 38 may assume the shape of two distinct, substantially identical coplanar surfaces 38b, e.g., having a central portion 42 formed and extending therebetween. The two distinct coplanar surfaces 38b may be located, for example, on opposite sides of the major side surface 24 with respect to the second median plane $M_2$ which bisects the throughbore 32, e.g., as shown in FIG. 3. In this case, the respective opening 34 of the through-bore 32 to the major side surface 24 may divide the central portion 42 into identical, two central surfaces 44, which may be recessed relative to the two coplanar surfaces 38b, i.e., the central surfaces 44 may be closer to the first median plane $M_1$ than the coplanar surfaces 38b.

In some embodiments, such as seen in FIG. 4, each planar portion 38 may be recessed relative to other portions of the respective major side surface 24, for example, relative to two or more relief surfaces 46, which are located on opposite sides of the major side surface 24 with respect to the planar portion 38, respectively. Thus, as seen in the minor side view of FIG. 4, each planar portion 38 is closer to the first median plane $M_1$ than the relief surfaces 46 are. Each relief surface 46 may extend to an edge 28, e.g., to one of the cutting edges 30 of the cutting insert 16, and assume, for example, a generally concave shape in order to comply with clearance requirements or other functional requirements of the cutting insert 16. Thus, in some embodiments, the relief surfaces 46 may be concave in a direction away from the adjacent cutting edge 30.

In some embodiments, when the cutting insert 16 is retained in the insert pocket 14, the first planar portion 38' engages the one or more abutment regions 40 of the supporting wall 36, which may protrude with respect to other surfaces of the insert pocket 14 located adjacent thereto. The first planar portion 38' may be the only portion of the first major side surface 24' to engage the insert pocket 14. Thus, the relief surfaces 46 or other portions of the first major surface 24' other than the first planar portion 38' do not engage the one or more abutment regions 40 of the supporting wall 36 or any other portion of the inset pocket 14, e.g., as shown in FIG. 5. In addition, the first planar portion 38' may planarly surface-engage the supporting wall at the one or more abutment regions, and thus provide solid securing of the cutting insert 16 in the insert pocket 14.

In some embodiments, the planar portions 38, which are partially confined by the respective relief surfaces 46, do not extend all the way to any of the cutting edges 30 and are spaced apart therefrom by the relief surfaces 46. Thus, for example, the free second planar portion 38", which does not engage the supporting wall 36, does not extend to any cutting edge 30, e.g., an operative cutting edge of the cutting insert 16, and thereby does not interfere with any clearance functionality or other cutting functionalities associated with the cutting operation.

While the present invention has been described with reference to one or more specific embodiments, the description is intended to be illustrative as a whole and is not to be construed as limiting the invention to the embodiments shown. It is appreciated that various modifications may occur to those skilled in the art that, while not specifically shown herein, are nevertheless within the scope of the invention.

What is claimed is:

1. A tangential, double-sided cutting insert comprising:
   two opposing rake surfaces and a peripheral surface extending therebetween, the peripheral surface comprising two identical, opposing major side surfaces, and two opposing minor side surfaces, wherein each major side surface comprises:
      at least two relief surfaces, wherein each relief surface extends to a respective cutting edge formed at an intersection between an associated rake surface and said each major side surface; and
      a planarly ground planar portion located between the relief surfaces and recessed relative thereto, as seen in a minor side view of the cutting insert.

2. The cutting insert of claim 1, wherein the planar portion comprises a single planar surface.

3. The cutting insert of claim 1, wherein the planar portion extends out to at least one of the minor side surfaces.

4. The cutting insert of claim 2, wherein:
   the planar portion has a generally rectangular shape, the planar portion surrounding a through-bore for receiving a securing component therein, the through-bore extending between, and opening out to, both major side surfaces; and
   the through-bore is bisected by a median plane of the cutting insert, which extends through the two rake surfaces and the two major sides, and is substantially perpendicular to the planar portion.

5. The cutting insert of claim 1, wherein:
   the planar portion comprises two distinct, coplanar ground surfaces that are located on different sides of the major side surface with respect to a median plane of the cutting insert, wherein the median plane extends through the two rake surfaces and the two major side surfaces, and is substantially perpendicular to the planar portion; and
   the median plane bisects a through-bore for receiving a securing component therein, wherein the through-bore extends between, and opens out to, both the major side surfaces.

6. The cutting insert of claim 1, wherein the relief surfaces are substantially concave.

7. The cutting insert of claim 1, wherein the planar portion associated with a given major side surface is spaced apart from the cutting edges associated with that given major side surface.

8. The cutting insert of claim 1, wherein:
   the major side surfaces are larger in area than the rake surfaces and the minor side surfaces;
   each planar portion comprises a single, planarly ground surface, having a generally rectangular shape, and surrounding a respective opening of a through-bore for receiving a securing component therein, the through-bore extending between, and opening out to, the two major side surfaces;
   the two planar portions extend mutually parallel to one another, and extend generally parallel to a first median plane of the cutting insert, which extends through the two minor side surfaces and through the two rake surfaces;
   the through-bore is bisected by a second median plane of the cutting insert, which passes through the two major side surfaces and the two rake surfaces, and is perpendicular to the first median plane;
   the relief surfaces of each major side surface are generally concave; and
   each planar portion associated with a given major side surface extends to at least one of the minor side surfaces, but is spaced apart from the cutting edges associated with that given major side surface.

9. A cutting tool, comprising:
   at least a cutting portion formed at an end thereof, the cutting portion comprising an insert pocket having a double-sided, tangential cutting insert releasably retained therein;
   the cutting insert comprising two opposing rake surfaces and a peripheral surface extending therebetween, the peripheral surface comprising two identical, opposing major side surfaces and two opposing minor side surfaces, wherein each major side surface comprises:
      at least two relief surfaces, each relief surface extending to a respective cutting edge formed at an intersection between an associated rake surface and said each major side surface; and
      a planarly ground planar portion located between the relief surfaces and recessed relative thereto, as seen in a minor side view of the cutting insert; and
   wherein the planar portion is in engagement with at least one abutment region of a supporting wall of the insert pocket.

10. The cutting tool of claim 9, wherein each planar portion extends out to at least one of the two minor side surfaces.

11. The cutting tool of claim 9, wherein:
   each planar portion comprises a single, planar surface, which has a generally rectangular shape, and which surrounds a respective opening of a through-bore that receives a securing component therein, wherein the through-bore extends between, and opens out to, both the major side surfaces; and the through-bore is bisected by a median plane, wherein the median plane extends through the two rake surfaces and the two major sides, and is substantially perpendicular to the planar portions.

12. The cutting tool of claim 9, wherein:
each planar portion comprises two distinct, coplanar surfaces, located on different sides of the major side surface with respect to a median plane of the cutting insert, wherein the median plane extends through the two rake surfaces and the two major sides, and is substantially perpendicular to the planar portions; and
the median plane bisects a through-bore that receives a securing component therein, wherein the through-bore extends between, and opens out to, both major side surfaces.

13. The cutting tool of claim 9, wherein the relief surfaces are substantially concave.

14. The cutting tool of claim 9, wherein the planar portions are spaced apart from the cutting edges associated with the major side surfaces to which the planar portions belong.

15. The cutting tool of claim 9, wherein:
the major side surfaces are larger in area than the rake surfaces and the minor side surfaces;
each planar portion comprises a single, planarly ground planar surface having a generally rectangular shape, and surrounding a respective opening of a through-bore for receiving a securing component therein, the through-bore extending between, and opening out to, the two major side surfaces;
the two planar portions extend mutually parallel to one another, and extend generally parallel to a first median plane of the cutting insert, which extends through the two minor side surfaces and through the two rake surfaces;
the through-bore is bisected by a second median plane of the cutting insert, which passes through the two major side surfaces and the two rake surfaces, and is perpendicular to the first median plane;
the relief surfaces of each major side surface are generally concave; and
each planar portion associated with a given major side surface extends to at least one of the minor side surfaces, but is spaced apart from the cutting edges associated with that given major side surface.

* * * * *